US007912727B2

(12) United States Patent  (10) Patent No.: US 7,912,727 B2
Gao et al.  (45) Date of Patent: Mar. 22, 2011

(54) APPARATUS AND METHOD FOR INTEGRATED PHRASE-BASED AND FREE-FORM SPEECH-TO-SPEECH TRANSLATION

(75) Inventors: Yuqing Gao, Mount Kisco, NY (US);
Liang Gu, Yorktown, NY (US);
Hong-Kwang Kuo, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/128,727

(22) Filed: May 29, 2008

(65) Prior Publication Data

US 2009/0055160 A1  Feb. 26, 2009

Related U.S. Application Data

(63) Continuation of application No. 11/427,620, filed on Jun. 29, 2006, now abandoned.

(51) Int. Cl.
*G01L 21/00* (2006.01)
*G01L 13/00* (2006.01)
*G06F 17/28* (2006.01)

(52) U.S. Cl. ............... 704/277; 704/2; 704/4; 704/258
(58) Field of Classification Search .................. None
See application file for complete search history.

(56) References Cited

U.S. PATENT DOCUMENTS

| 5,640,575 | A * | 6/1997 | Maruyama et al. | 704/4 |
|---|---|---|---|---|
| 7,421,394 | B2 * | 9/2008 | Omi et al. | 704/277 |
| 2005/0055217 | A1 * | 3/2005 | Sumita et al. | 704/277 |
| 2006/0206304 | A1 * | 9/2006 | Liu | 704/2 |
| 2007/0043553 | A1 * | 2/2007 | Dolan | 704/2 |
| 2008/0262828 | A1 * | 10/2008 | Och et al. | 704/3 |

OTHER PUBLICATIONS

Gao, Y. et al. "IBM Mastor System: Multilingual Automatic Speech-to-speech Translator," Proceedings of the Workshop on Medical Speech Translation at HLT-NAACL, Jun. 9, 2006.*
Arons, Barry, "SpeechSkimmer: A System for Interactively Skimming Recorded Speech", ACM Transactions on Computer-Human Interaction, vol. 4, No. 1, Mar. 1997, pp. 3-38.
Rayner, Manny, et al, "A Speech to Speech Translation System Built From Standard Components", pp. 217-222.
McTear, Michael F., "Spoken Dialogue Technology: Enabling the Conversational User Interface", ACM Computing Surveys, vol. 34, No. 1, Mar. 2002, pp. 90-169.

* cited by examiner

*Primary Examiner* — Matthew J Sked
(74) *Attorney, Agent, or Firm* — Cantor Colburn LLP; Ann Dougherty

(57) ABSTRACT

An apparatus and method that integrates both phrase-based and free-form speech-to-speech translation approaches using probability models. The starting step of the method is to receive vocal communication in a source language. Then store the received vocal communication. Then decipher the content of the vocal communication. Then locate in a multilingual dictionary module the corresponding translation of the deciphered vocal communication provided a preset sentence exists in a speech recognition module for the vocal communication. Then translate the vocal communication into the target language provided there is no corresponding translation located in the multilingual dictionary module. Then synthesize the translated target language when there is no corresponding translation for the vocal communication in the multilingual dictionary module. Then store the sound of the translated target language. Then play the sound of the translated target language.

3 Claims, 2 Drawing Sheets

APPARATUS AND METHOD FOR INTEGRATED PHRASE-BASED AND FREE-FORM SPEECH-TO-SPEECH TRANSLATION

CROSS REFERENCE TO RELATED APPLICATIONS

This application is a continuation of U.S. patent application Ser. No. 11/427,620 filed Jun. 29, 2006, the contents of which are incorporated by reference herein in their entirety.

STATEMENT REGARDING FEDERALLY SPONSORED RESEARCH

This invention was made with Government support under Contract No. NBCH2030001 awarded by the Defense Advanced Research Projects Agency (DARPA). The Government has certain rights in this invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to translating from one language to another language, and more particularly, to an apparatus and method for integrated phrase-based and free-form speech-to-speech translation.

2. Description of Background

Presently, a variety of speech translation devices are commercially being sold. Generally, speech translation is performed according to two main approaches which are (1) phrase-based, also known in the art as sentence based and (2) free-form speech-to-speech translation. Those in the art typically share the common belief that phrase-based speech-to-speech translation is more mature for product deployment because the quality of translation is substantially guaranteed and controlled. However, phrase-based sentences are extremely difficult for users to remember. Quite often users forget the sentences and generally become frustrated with the approach. The free-form approach is used sometimes to resolve this problem but the quality of the free-form approach is not substantially guaranteed. Sometimes the user wants to be absolutely sure that what is spoken is translated without any miscommunication and that is generally when a user prefers to use the phrase-based speech-to-speech translation approach.

Unfortunately, to the user's detriment, a user desiring a speech translation apparatus is limited to either a (1) phrase-based or (2) a free-form speech-to-speech translation apparatus. This limitation is imposed upon users because there is no translation apparatus currently on the market that integrates both translation approaches. Purchasing both apparatuses is generally costly for a user. Furthermore, for the user that purchases both apparatuses, the user has to contend with the burden of carrying two apparatuses which imposes a heavier tote load on the user and yields a higher probability of the user losing one or both apparatuses.

Thus, there is a need for a translation apparatus that integrates both (1) phrase-based and (2) free-form speech-to-speech translation approaches.

SUMMARY OF THE INVENTION

The shortcomings of the prior art are overcome and additional advantages are provided through the provision of a translation apparatus that integrates both phrase-based and free-form speech-to-speech translation approaches using probability models. The apparatus includes a housing. The apparatus further includes a first communication member embedded in the housing. The first communication member is configured to receive vocal communication from a user speaking in a source language. The apparatus further includes an input audio buffer operably connected to the first communication member. The input audio buffer is configured to store the vocal communication transferred from the first communication member. The apparatus further includes a speech recognition module configured to recognize a plurality of preset sentences and a plurality of free-form sentences. The speech recognition module is further configured to receive the vocal communication from the input audio buffer and decipher the content of the vocal communication. The apparatus further includes a multilingual dictionary module operably connected to the speech recognition module. The multilingual dictionary module is configured to locate a corresponding translation of the vocal communication provided a preset sentence exists in the speech recognition module for the vocal communication. The apparatus further includes a translation module operably connected to the speech recognition module. The translation module configured to translate the vocal communication into the target language provided there is no corresponding translation located in the multilingual dictionary module. The apparatus further includes a synthesis module operably connected to the translation module. The synthesis module configured to synthesize text to speech (TTS) for the translated target language. The apparatus further includes an output audio buffer operably connected to the multilingual dictionary module and the synthesis module. The output audio buffer is configured to store pre-recorded speech sounds from the multilingual dictionary module corresponding to the translated vocal communication and further configured to store the synthesized speech sounds from the synthesis module corresponding to the translated target language. The apparatus further includes a second communication member embedded in the housing and operably connected to the output audio buffer. The second communication member is configured to receive and play the stored sounds in the output audio buffer.

The shortcomings of the prior art are overcome and additional advantages are provided through the provision of a method that integrates both phrase-based and free-form speech-to-speech translation approaches using probability models. The method includes receiving vocal communication in a source language. Then storing the received vocal communication. Then deciphering the content of the vocal communication. Then locating in a multilingual dictionary module the corresponding translation of the deciphered vocal communication provided a preset sentence exists in a speech recognition module for the vocal communication. Then translating the vocal communication into the target language provided there is no corresponding translation located in the multilingual dictionary module. Then synthesizing the translated target language when there is no corresponding translation for the vocal communication in the multilingual dictionary module. Then storing the sound of the translated target language. Then playing the sound of the translated target language.

Additional features and advantages are realized through the techniques of the proposed invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for an apparatus and a method that integrates both phrase-based and free-form speech-to-speech translation approaches using probability models.

BRIEF DESCRIPTION OF THE DRAWING

The subject matter regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
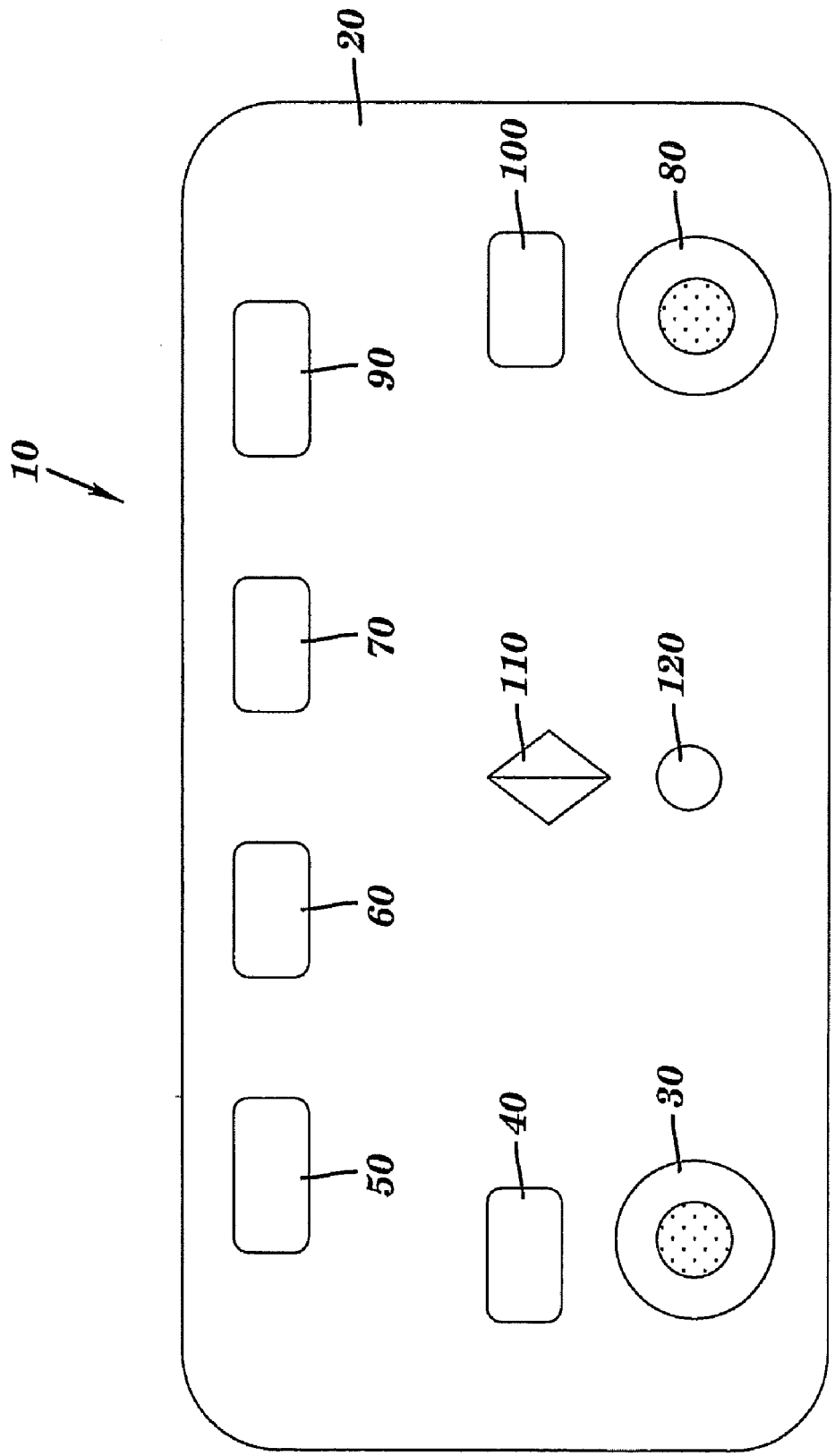
FIG. 1 is a schematic diagram illustrating one example of an apparatus that integrates both phrase-based and free-form speech-to-speech translation approaches using probability models, in accordance with an embodiment of the present invention.

The detailed description explains the preferred embodiments of the invention, together with advantages and features, by way of example with reference to the drawings.

DETAILED DESCRIPTION OF THE INVENTION

Modern speech-to-speech recognition systems aim toward facilitating communications between people speaking different languages. To achieve this goal, a typical speech translation system (1) collects the speech signal from one speaker, (2) recognizes the speech in the source language, (3) translates the recognized messages into the target language, (4) synthesizes the speech sound of the translated sentence, and (5) plays it by way of a speaker. Steps (2), (3) and (4) are commonly realized by the techniques of automatic speech recognition (ASR), machine translation (MT) and text-to-speech synthesis (TTS), respectively.

Current speech-to-speech translation systems realize the above translation function by way of two main speech translation approaches: (i) phrase-based (also commonly known as sentence-based) and (ii) free-form. The phrase-based translation approach (i) carries out speech-to-speech in the following manner:

1) Record the whole speech sentence from one speaker;
2) Recognize the speech message in the source language by selecting the best phrase candidate from a preset phrase/sentence pool based on both acoustic and context information such as finite-state grammar;
3) Translate the recognized message into the target language by looking up a preset phrase/sentence in a multilingual dictionary;
4) Pick the corresponding pre-recorded speech sound of the translated phrase; and
5) Play the selected sound file.

The primary advantage of this phrase-based approach is that, if the ASR output is correct, it can provide perfect translation and very high quality speech sound in the target language. It is relatively simple to implement at a very low computational cost compared with free-form speech translation approaches. It is therefore believed that this phrase-based speech-to-speech translation approach is more mature for product deployment. However, there is also a critical drawback of the phrase-based speech translation approach: The coverage of ASR and MT is commonly quite low and hence significantly limits its applications. In particular, the preset sentence pool usually consists of thousands of sentences within a limited domain. When such a translation device is used, the preset sentences are extremely difficult to remember and users can get easily frustrated. Furthermore, if the user cannot find a corresponding phrase/sentence in the preset pool to represent his/her message to be delivered, the multilingual communication between the two speakers will have to be stopped for that topic and the user will get even more frustrated.

The free-form speech translation approach (ii) avoids the drawbacks in the phrase-based translation by performing speech-to-speech in the following manner:

1) Get speech signals from one speaker and stores them in an audio buffer;
2) Recognize the speech message corresponding to the waveform signals in the audio buffer by maximizing the posterior probability of the recognized text based on pre-trained acoustic models and language models;
3) Translate the recognized message into the target language by maximizing the posterior probability of the translated text based on pre-trained translation models;
4) Synthesize translated sentence based on pre-trained TTS models;
5) Play out the synthesized speech signal.

The strength of the free-form translation approach lies in its broad word/phrase coverage and ease of use, at the cost of potentially lower ASR accuracy, worse TTS quality and less accurate MT performance and the correctness is not guaranteed. The latter drawback may become critical when the user wants to be absolutely sure that what they said is translated without any mistake.

To avoid the drawbacks of both the above approaches, embodiments of the present disclosure integrate the phrase/sentence-based approach and the free-form approach in one single framework. Referring to FIG. 1, an apparatus 10 that integrates both phrase-based and free-form speech-to-speech translation approaches using probability models, is shown. The apparatus 10 includes a housing 20. The housing 20 may be constructed from a variety of materials, such as, but not limited to plastic and metal, etc.

A first communication member 30 is embedded in the housing 20. The first communication member 30 is configured to receive vocal communication from a user speaking in a source language.

An input audio buffer 40 is operably connected to the first communication member 30. The input audio buffer 40 is configured to store the vocal communication transferred from the first communication member 30.

A speech recognition module 50 configured to recognize a plurality of preset sentences and a plurality of free-form sentences. The speech recognition module 50 is further configured to receive the vocal communication from the input audio buffer 40 and decipher the content of the vocal communication. The speech recognition module 50 yields the best recognition output when $\hat{w} = \arg_w \max p(X|W, \lambda_w)$, where $\lambda_w$ is the probability weight for a given text W and $1 \geq \lambda_w \geq 0$. Furthermore, the combination weight between the phrase-based approach and the free-form approach of speech-to-speech translation may be either one of, (i) user adjusted and (ii) automatically optimized due to previously recorded conversations. If (i) user adjusted, the user may maneuver the control mechanism on the apparatus 10 in order to select the weight of the free-form or phrase-based functionality. The user has the option to choose the weight to be an entirely phrase-based system or a totally free-form system. Furthermore, the user has the option to choose the weight to be somewhere in between both the free-form and phrase-based functionality.

A multilingual dictionary module 60 is operably connected to the speech recognition module 50. The multilingual dictionary module 60 is configured to locate a corresponding translation of the vocal communication, provided a preset sentence exists in the speech recognition module 50 for the vocal communication.

A translation module 90 is operably connected to the speech recognition module 50. The translation module 90 is configured to translate the vocal communication into the target language provided no corresponding translation was located in the multilingual dictionary module 60.

A synthesis module 100 is operably connected to the translation module 90. The synthesis module 100 is configured to synthesize text to speech (TTS) for the translated target language. The TTS synthesis occurs for at least one of, (i) free-form TTS for handling any text, but the free-form translation approach may not sound as natural as the phrase-based translation approach, which utilizes pre-recorded sentences. The phrase-based translation approach produces a more natural sound but the approach is limited in application because there is only a fixed set of sentences available for use.

An output audio buffer 70 is operably connected to the multilingual dictionary module 60 and the synthesis module 100. The output audio buffer 70 is configured to store the prerecorded speech sounds from the multilingual dictionary module 60 that correspond to the translated vocal communication. The output audio buffer 70 is further configured to store the synthesized speech sounds from the synthesis module 100 that correspond to the translated target language.

A second communication member 80 is embedded in the housing 20. The second communication member 80 is operably connected to the output audio buffer 70. The second communication member 80 is configured to receive and play the stored sounds in the output audio buffer 70.

A selection switch 110 is embedded in the housing 20. The selection switch 110 allows the user of the apparatus 10 to selectively choose between either one of the: (i) phrase-based approach and the (ii) free-form approach of speech-to-speech translation.

An on/off switch 120 is embedded in the housing 20. The on/off switch 120 initiates and terminates the operation of the apparatus 10.

Figure 2:
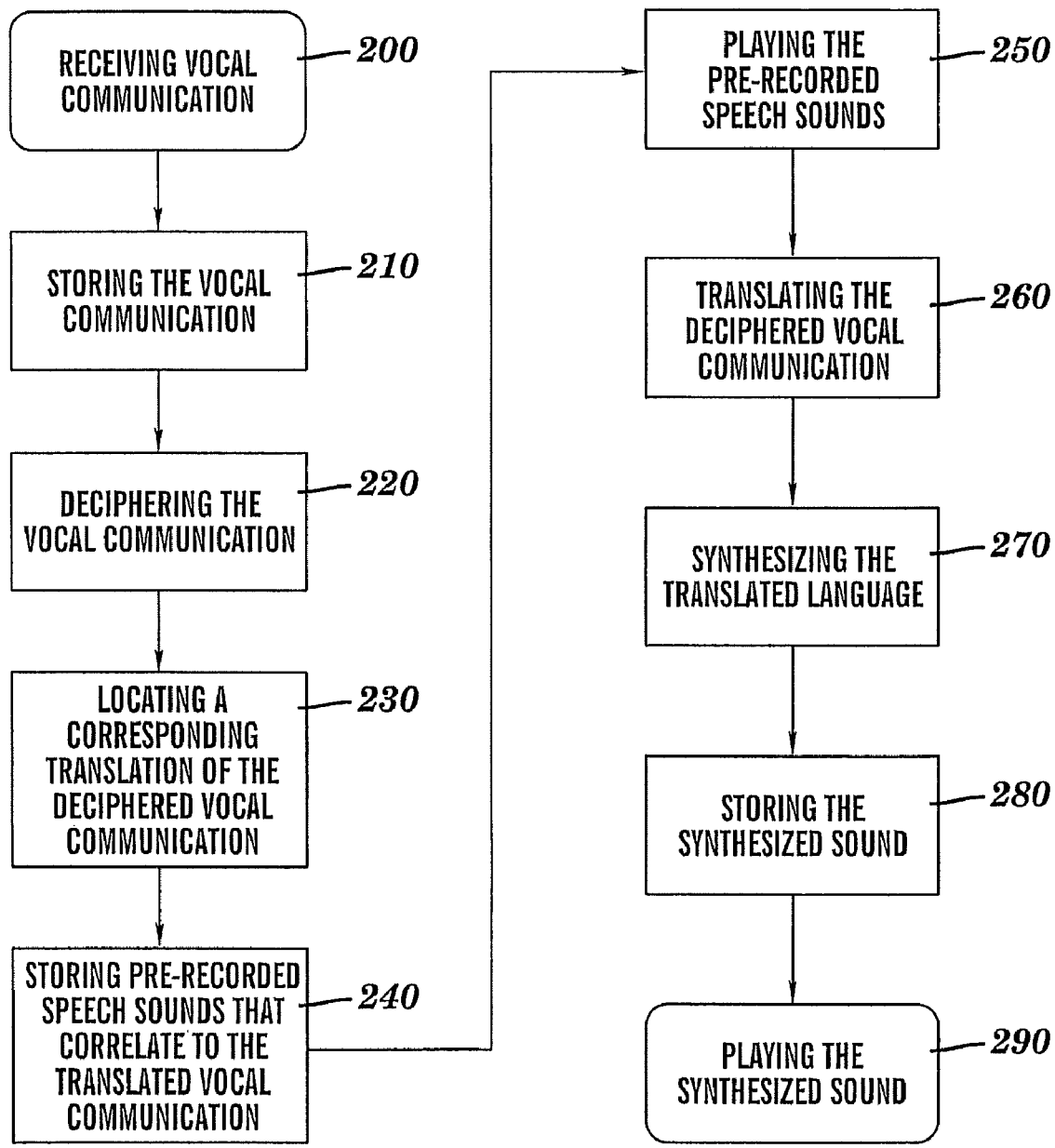
FIG. 2 is a flow diagram illustrating a method that integrates both phrase-based and free-form speech-to-speech translation approaches using probability models, in accordance with another embodiment of the invention.

Referring to FIG. 2, a method that integrates both phrase-based and free-form speech-to-speech translation approaches using probability models, is shown.

Starting at step 200, a vocal communication is received in a source language, subsequently, the received vocal communication is stored, as shown in step 210.

The content of the vocal communication is deciphered, as shown in step 220. At step 230, the corresponding translation of the deciphered vocal communication is located provided a preset sentence exists in a speech recognition module 50 for the vocal communication.

If there is no corresponding translation located in a multilingual dictionary module 60 the vocal communication is translated into the target language, as shown in step 240. Afterwards, the target language is synthesized when there is no corresponding translation for the vocal communication in the multilingual dictionary module 60, as shown in step 250. Then the sound of the translated language is stored, as shown in step 260. Subsequently, in step 270, the sound of the translated language is played.

In an exemplary embodiment, recognition of the speech message corresponding to the waveform signals in the audio buffer (described above in step 220), may be implemented, for example, through free-form ASR with user configurable scalable embedded phrase/sentence-based ASR. Given an input speech signal X, the best recognition output $\hat{w}$ may be selected as $\hat{w}=\arg_w \max p(X|W, \lambda_w)$, where $\lambda_w$ is the probability weight (or scalable factor) for a given text W and $1 \geq \lambda_w \geq 0$. It is further assumed that the preset phrase/sentence set $S=\{s_m, 1 \leq m \leq M\}$ contains M preset phrases/sentences. Both the currently used phrase/sentence-based and free-form speech translation can be categorized as two special cases. More specifically, (1) If $\lambda_w=0$, $\forall W$, then the approach becomes conventional free-form speech translation; (2) If $$\lambda_W = \begin{cases} 1, \forall W \in S \\ 0, \text{otherwise} \end{cases},$$

then the approach is equivalent to the conventional phrase/sentence-based speech translation targeting phrase/sentence set $S=\{s_m, 1 \leq m \leq M\}$; (3) If $$\lambda_W = \begin{cases} \lambda, \forall W \in S \\ 1-\lambda, \text{otherwise} \end{cases},$$

where $1 \geq \lambda \geq 0$ is a global scalable factor, then the approach is expanded into a free-form speech translation with user configurable embedded phrase/sentence-based function. In particularly, the users can adjust λ on the spot according to their need at that specific moment. If the users are most likely to say the phrases/sentences in $S=\{s_m, 1 \leq m \leq M\}$ and have great concerns about accuracy, they should increase λ and set it close to 1. On the other hand, if the users want more flexibility and topic coverage during speech translation, they should lower λ and the proposed system will be more and more similar to free-form speech translation approach; (4) If $0 \leq \lambda_w \leq 1$, $\forall \lambda_w$, the approach becomes a fully integrated system of both free-form and phrase/sentence-based speech translation approaches. $\lambda_w$ represents the weight of sentence W and may be determined by the users either explicitly (on the user interface) or implicitly (such as based on the use frequency of W within a limited time period). The users can decide either explicitly or implicitly the importance of each preset phrases/sentences and the speech translation (for example, ASR, MT and TTS) quality will be enhanced for these phrases/sentences accordingly. When $\lambda_w$ reaches 1, then the quality of all the technical components (ASR, MT and TTS) will be guaranteed, which should be extremely useful for some quality critical speech translation applications, such as emergency medical help or force protection.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A translation apparatus that integrates both phrase-based and free-form speech-to-speech translation approaches using probability models, comprising:
   a housing;
   a first communication member embedded in the housing, the first communication member configured to receive vocal communication from a user speaking in a source language;
   an input audio buffer operably connected to the first communication member, the input audio buffer configured to store the vocal communication transferred from the first communication member;
   a speech recognition module configured to recognize a plurality of preset phrases and a plurality of free-form phrases, the speech recognition module further configured to receive the vocal communication from the input audio buffer and decipher the content of the vocal communication;
   a multilingual dictionary module operably connected to the speech recognition module, the multilingual dictionary module configured to locate a corresponding translation of the vocal communication provided a preset phrase exists in the speech recognition module for the vocal communication;
   a translation module operably connected to the speech recognition module, the translation module configured to translate the vocal communication into the target language;
   a synthesis module operably connected to the translation module, the synthesis module configured to synthesize text to speech (TTS) for the translated target language;
   an output audio buffer operably connected to the multilingual dictionary module and the synthesis module, the output audio buffer configured to store prerecorded speech sounds from the multilingual dictionary module corresponding to the translated vocal communication and further configured to store the synthesized speech sounds from the synthesis module corresponding to the translated target language;
   a second communication member embedded in the housing and operably connected to the output audio buffer, the second communication member configured to receive and play the stored sounds in the output audio buffer; and
   a selection switch embedded in the housing for allowing the user to selectively choose between either one of the phrase-based approach and the free-form approach of speech-to-speech translation;
   wherein the TTS synthesis occurs for at least one of, (i) free-form TTS for handling text and (ii) phrase-based large inventory pre-recorded sentences and phrases.

2. The apparatus of claim 1, wherein the speech recognition module configured to decipher the form of the vocal communication yields the best recognition output when $\hat{w}=\arg_w \max p(X|W, \lambda_w)$, where $\lambda_W$ is the probability weight for a given text W and $1 \geq \lambda_w \geq 0$, wherein $\hat{w}$ is the recognition result and X represents the input speech signal.

3. The apparatus of claim 2, further including an on/off switch embedded in the housing.

* * * * *